Aug. 20, 1929. G. R. HOFFMAN Re. 17,412

BRAKING MECHANISM, MORE PARTICULARLY FOR MOTOR VEHICLES

Original Filed May 29, 1926

INVENTOR

Henry R. Hoffman

BY

ATTORNEY

Reissued Aug. 20, 1929.

Re. 17,412

UNITED STATES PATENT OFFICE.

GLENN R. HOFFMAN, OF EAST ST. LOUIS, ILLINOIS, ASSIGNOR, BY MESNE ASSIGNMENTS, TO HOFFMAN-PAULDING COMPANY, A CORPORATION OF MICHIGAN.

BRAKING MECHANISM, MORE PARTICULARLY FOR MOTOR VEHICLES.

Original No. 1,627,508, dated May 3, 1927, Serial No. 112,651, filed May 29, 1926. Application for reissue filed January 14, 1929. Serial No. 332,985.

My invention relates to braking mechanism for motor vehicles, and more particularly for motor cars of the Ford type. It has for its objects to provide a construction in which the brake-band of the brake-drum of the "transmission" and the Ford standard type of emergency brake for each rear wheel of the motor may both be applied at the same time through actuation of the foot-pedal of the transmission brake-band, or the emergency brakes alone applied without affecting the braking of the brake-drum of the "transmission."

It has further for its object to make possible applying the invention to the standard Ford type of motor car by connecting the foot-pedal of the transmission brake-band with the emergency brake through a simple change in and addition to its standard emergency brake-rods. It has also for its object to provide a construction wherein the transmission of power from the foot-pedal and also from the emergency hand-lever, to the emergency brake will be substantially in a straight or direct line through the connecting rod and link operated from the foot-pedal, or the emergency brake-lever, and the emergency brake, thereby producing a more effective braking action. It has also for its object to provide a construction wherein the transmission brake-band foot-pedal and the emergency brake lever will both be connected with the same emergency brake by a floating fulcrum member and link, so that whether the foot-pedal, or the hand-lever be operated the emergency brake will be applied, the connecting rod of the foot-pedal constituting the fulcrum when the hand-lever is operated, and the hand-lever connecting rod constituting the fulcrum when the foot-pedal is operated, the fulcrum being changed in position in each operation by change of position of the floating fulcrum member.

To the accomplishment of the foregoing, and such other objects as may hereinafter appear, the invention consists in the features hereinafter particularly described and then sought to be defined by the claims, reference being had to the accompanying drawing forming a part hereof, and in which, Figure 1 is a plan view of a chassis, such for instance of the Ford type, showing portion of a Ford transmission and the rear wheels of the vehicle, with my invention applied;

Figure 1:
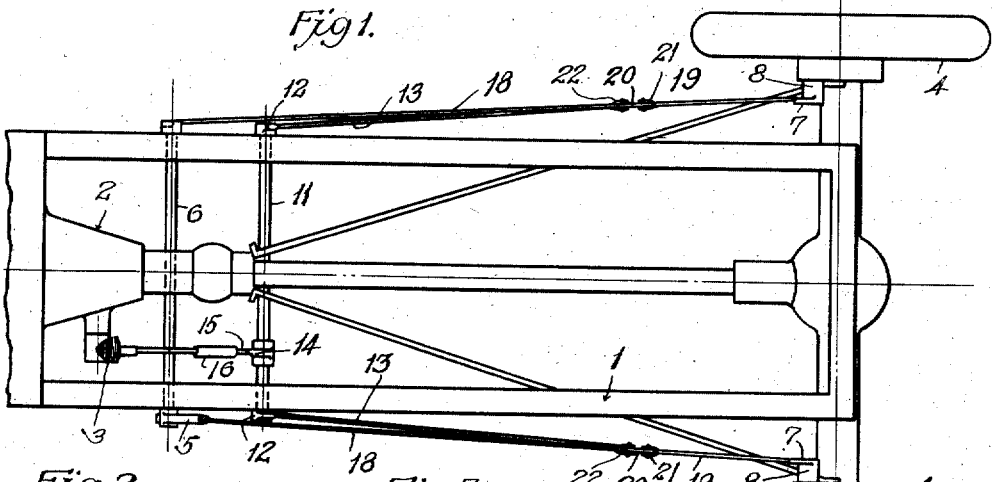

In the drawing, the numeral 1 designates in general, in a conventional way, a Ford motor chassis; 2 the transmission case containing the well-known Ford "transmission" (not illustrated); 3 the foot-pedal for operating the brake-band of the brake-drum, in the usual way; 4 the rear wheels of the chassis frame with which is associated the well-known emergency brakes in the form of well-known brake shoes such as commonly employed in Ford motors and adapted to be actuated from the emergency hand-lever 5 through the shaft 6 and rods connecting the cranks of the shaft with the cranks 7 of the stub shafts 8 which carry the cams 9 disposed between the free ends of the brake-shoes 10 for spreading the hinged members of the shoes to cause the shoes to frictionally grip the interior of the drums 17 which enclose the emergency brakes. The parts so far described are of the well-known standard Ford type of construction and need no more detailed illustration or description.

My present invention contemplates certain additions to the brake applying means referred to whereby the emergency brake for each of the rear wheels may be actuated from the foot-pedal which actuates the brake-band of the transmission and at the same time that the transmission brake is applied so that the emergency brakes may efficiently brake the rear wheels at the same time that the transmission brake is applied without the employment of additional or supplemental brakes for emergency braking. With that end in view, I provide a rocking-shaft 11 supported by suitable boxings from a part of the chassis-frame and provided with cranks 12 to which will be connected rods 13 having connection, preferably as hereinafter described, with the emergency brake-shoe cams, the shaft 11 being also provided with a crank 14 which is suitably connected say by a link 15 with the foot-pedal 3, the link 15 being preferably formed with a turn-buckle 16 for adjustment in length. Under a construction substantially such as described, when the foot-pedal is operated to apply the transmission brake-band the emergency brakes are at the same time applied and thus a most efficient braking of the car is effected, under the complete and easy control of the driver, and without the necessity of a separate operation of the emergency brake-lever for actuating the emergency brakes. Furthermore, the constructive features specified dispense with the necessity of employment of brake-bands supplemental to the ordinary brakes for the rear wheels in emergency braking. This effects a material saving in construction cost and lessens the number of parts and wear and tear while at the same time making it possible to employ parts already in use, especially of the desirable Ford type of construction.

While the emergency brakes can be applied at the same time that the transmission brake-band is applied, they can also be applied independently of the transmission brake when desired through the instrumentality of the Ford standard rock-shaft 6, its hand-lever 5 and the rods 18 connected at one end to the usual cranks of the rock-shaft 6, and having connection at their other ends with the emergency brakes for the rear wheels of the vehicle. I prefer to connect the rods 18 and also the rods 13 with the emergency brakes or brake-shoes by means of links 19 connected at one end to the cranks 7 of the cam shafts 8 and pivotally connected at the other end to the hinged or swinging members 20 to which members the ends of the rods 13 and 18 are also pivotally connected, the pivotal points of the rods being indicated by the reference numerals 21, 22 and 23. The member 20 having the rods pivotally connected to it as specified constitutes what may be designated as a floating fulcrum member because it is fulcrumed to the ends of the rods 13 and 18 at the pivots 22 and 23, respectively. The result is that when the emergency brake-lever 5 is shifted to apply the emergency brakes it pulls on rods 18 which swings members 20 to the position illustrated in Figure 2 with the pivotal connections 22 to rods 13 serving each as fulcrums on which members 20 turn or pivot and bringing the links 19 and pivots 21 to the position shown in the same figure with the emergency brakes applied, with the rods 18 and links 19 in alinement and the pull in a direct line through the length of rods 18 and links 19.

Figure 3:
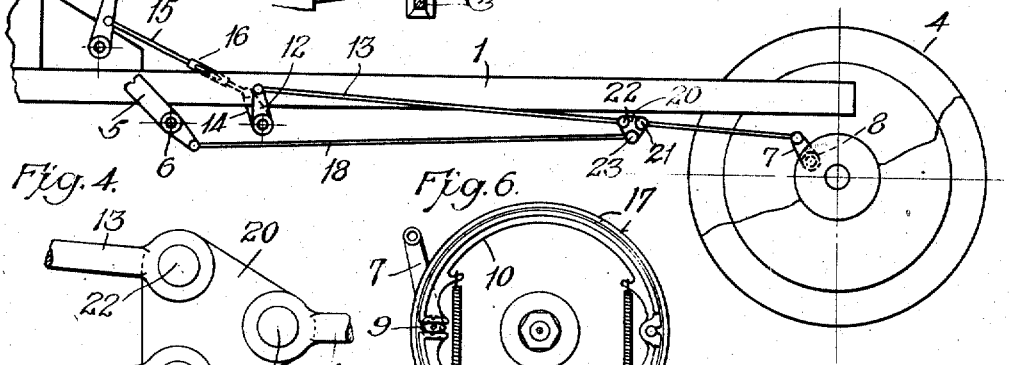
Figure 3 is a similar side elevation showing position of parts when the "transmission" brake-band and also the emergency brakes have been applied through actuation of the "transmission" brake foot-pedal.

To apply the transmission brake band and emergency brakes at the same time, the foot-pedal or lever 3 is pressed forward which exerts through link 15 a pull on crank 14 so as to rock the shaft 11 and through its end cranks 12 a pull on rods 13 which swings members 20 on fulcrum pivots 23 at end of rods 18 and brings the pivots 21, 22 and 23 to the positions indicated in Figure 3, with rods 13 and links 19 in alinement and with both the transmission brake and the emergency brakes applied.

Figure 2:
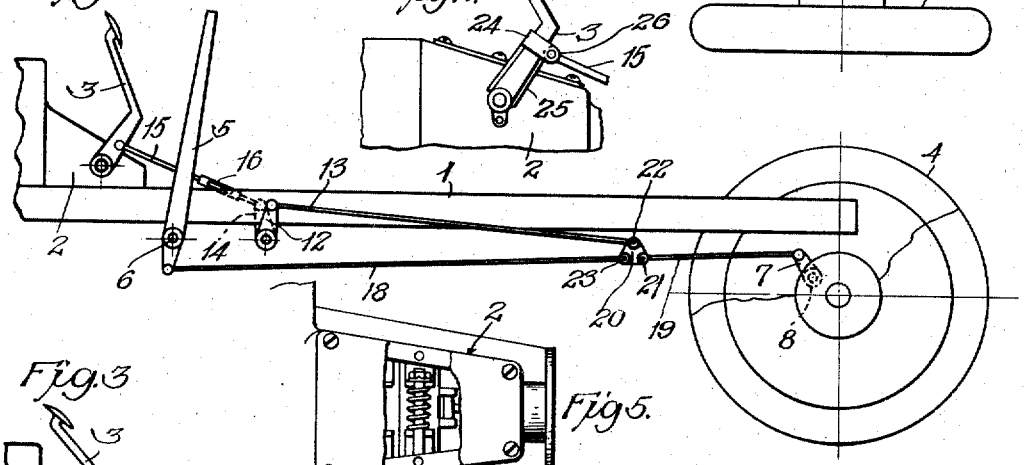
Figure 2 is a side elevation of Figure 1, showing the emergency brake lever in position with the emergency brakes applied by it.
Figure 4:
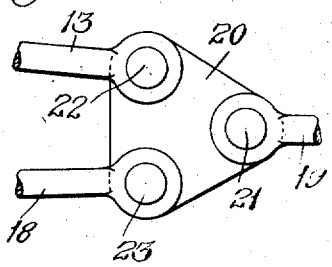
Figure 4 is a detail, showing the floating fulcrum member and its connected rods in neutral position.
Figure 6:
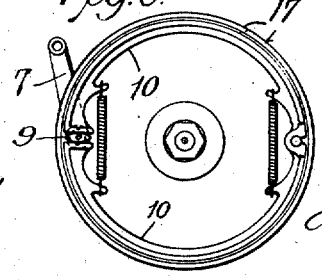
Figure 6 is a side view of one of the emergency brake-band elements of usual construction.

When both the transmission brake band and the emergency brakes are in normal or released position, the floating lever and fulcrum members 20 will stand in their neutral position as illustrated in Figure 4 of the drawing, wherein the pivots 21, 22 and 23 occupy positions intermediate of the positions indicated in Figures 2 and 3 of the drawing.

It will be noted that the foot-pedal 3 and the emergency brake lever 5 are both connected with the same emergency brake-band or shoe which heretofore has had only the emergency brake hand-lever connected therewith. The emergency brake hand-lever will have the locking dog, or pawl and ratchet, as in the standard Ford type of construction, and the transmission brake foot-pedal will be connected up with the transmission brake-drum band as in the well-known Ford construction, and therefore need not be illustrated and specifically described.

The operation of the several parts is clear from the foregoing description and the advantages gained appreciated by operators of motors cars as well as by those skilled in the art, particularly the automobile art.

I have illustrated and described with particularity the preferred details of the parts, but changes may be made therein, and other forms or embodiments of the invention employed without departing from the essential features so far as the more comprehensive scope of the invention is concerned.

Figure 7:
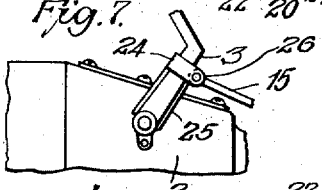
Figure 7 is a detail showing one manner of connecting the foot-pedal of the transmission and the link for connecting the crank shaft through which motion is transmitted to the emergency brakes.
Figure 5:
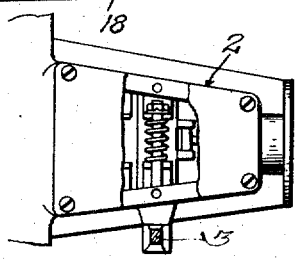
Figure 5 is a plan with a portion of the transmission housing broken away to show the transmission brake drum and band and associated parts.

Instead of attaching the turn-buckle rod 15 to the foot-lever 3 as shown in Figures 2 and 3, it may be attached by means of a clip 24 passed around the foot-lever and formed with a foot or leg 25 that will rest upon the hub of the lever and also formed with lugs or ears 26 to which the end of the rod will be attached by a bolt and nut as shown in Figure 7 of the drawing.

The brake-band of the transmission type of Ford car corresponds to what is commonly known in the art as a service brake, as it is employed for general service or running of the car, whereas the emergency brake is used in emergencies. Under the present invention, the service brake is supplemented by the emergency brake by having the two coupled together so that there may be a joint application of both the service and the emergency brake and yet permit the application of the emergency brake independently of the service brake.

The triangular disposition in relation to one another of the adjacent ends of the brake rods 13, 18 and 19, and their connection one with the other, affords a lever-coupling between them in which the fulcrum is at the pivotal point 23 when the pull is from the service brake lever and shifts from point 23 to point 22 when the pull is from the emergency brake lever, and vice versa in change from one lever to the other, as appears from the foregoing description, and causes the pull from either the service brake lever or the emergency brake lever to be in a substantially straight or direct line to the emergency brake through the brake rods whichever lever is manipulated as will appear from an inspection of Figures 2 and 3 of the drawing.

It will be observed under the construction illustrated and described, that when the service brake lever 3 is actuated the floating coupling member 20 will swing and turn on the pivot 23 as a fulcrum and carry pivots 22 and 21 with the connecting rods 13 and 19 to the position indicated in Fig. 3 of the drawing so as to jointly apply both the service and the emergency brake. For a further application of the emergency brake, if needed or desirable for any reason, by throwing the emergency brake lever in braking direction, it will pull on rod 18 which will swing the coupling member 20 so as to fulcrum on pivot 22 which will result in lowering and moving in a forward direction the pivot 21 and links or rods 19 and in further tightening the emergency brake on the brake drum of the rear wheel. If both the service and the emergency be off and it is desired to apply the emergency without first applying the service brake, the emergency lever 5 may be drawn to emergency application position, for instance, as illustrated in Fig. 2 of the drawing, which will swing the coupling member 20 on the pivot 22 as a fulcrum and bring the member 20 and rods 18 and 19 to the position shown in Figure 2, with the emergency brake applied and the service brake off. Owing to the triangular disposition of the pivots 23, 22 and 21, relatively to each other as shown, but a relatively short travel or swing of the coupling member and fulcrum points is necessary for the quick and efficient application of the brakes under the different conditions mentioned, and the few number of elements or parts necessary for the purpose contributes to longer life and efficiency in the braking mechanism.

Having described my invention and set forth its merits, what I claim is:—

1. A braking mechanism comprising a foot-lever operated "transmission" brake, a lever operated emergency wheel-brake, and means connecting both levers with the emergency wheel-brake, said means including a "floating" lever coupling member operable from the "transmission" brake lever for joint application of the transmission and the emergency brakes and from the emergency lever to apply the emergency-brake independently of the transmission brake.

2. A braking mechanism comprising a foot-lever operated "transmission" brake, a lever operated emergency wheel-brake, and means connecting both levers with the emergency wheel-brake, said means including a "floating" lever coupling member, connections between said member and the "transmission" brake-lever and emergency brake-lever, respectively, and a connection between the coupling member and emergency brake, the foot-lever connections serving for joint application of the transmission and emergency brakes, and the emergency lever connections serving for application of the emergency wheel-brake independently of the "transmission" brake.

3. A braking mechanism comprising a foot-lever operated "transmission" brake, a lever operated emergency wheel-brake, and means connecting both levers with the emergency wheel-brake, said means including a coupling member, connections between said member and the transmission lever and emergency lever, said connections being pivotally connected with the coupling member, and a connection between the coupling member and the emergency wheel-brake, said coupling member constituting a lever for power transmission from the foot-lever and the emergency lever, respectively, to the emergency wheel-brake and as a fulcrum connection between the member and the lever connections therewith.

4. A braking mechanism comprising a foot-lever operated "transmission" brake, a lever operated emergency wheel-brake, and means connecting both levers with the emergency wheel-brake, said means including a coupling member, connections between said member and the transmission lever and emergency lever and a connection between the member and the emergency brake, said member being supported by said connections and the connections being pivotally supported from the member, said member being responsive to one of the levers in applying both brakes and responsive to the other to apply only one of the brakes.

5. A braking mechanism comprising a plurality of brakes, an operating lever for each brake, one of the levers being connected with both brakes for joint action of the brakes and the other with one brake for its action independent of the other brake, the connections between the operating levers and one brake including a coupling member and rods connecting the levers thereto and a rod connecting the member with one of the brakes, one lever connecting rod adapted to be brought into alinement with the rod connecting the member to the brake to be actuated and the other rod out of alinement therewith in movement of the coupling member in the application of the brake.

6. In a motor driven conveyance, the combination of service and emergency brakes operatively connected one with the other and provided respectively with a service brake-lever and an emergency brake-lever, and a fulcrum lever coupling connected with the emergency brake and with the service brake lever for joint application of the service and emergency brakes and also with the emergency brake lever for independent application of the emergency brake.

7. In a motor driven conveyance, the combination of service and emergency brakes operatively connected one with the other and provided respectively with a service brake-lever and an emergency brake-lever, and a fulcrum coupling connected with the emergency brake and with the service brake lever for joint application of the service and emergency brakes and also with the emergency brake lever for independent application of the emergency brake, the connection with the emergency brake lever permitting an additional emergency brake application after the emergency brake is set by the application of both brakes from the service brake lever.

8. In a motor driven conveyance, the combination of service and emergency brakes operatively connected one with the other and provided respectively with a service brake-lever and an emergency brake-lever, and a fulcrum coupling connected with the emergency brake and having the service brake-lever connected at one fulcrum point with the fulcrum coupling for joint application of the service and emergency brakes and the emergency brake lever connected at another fulcrum point with the fulcrum coupling for independent application of the emergency brake, the fulcrum point of connection of the emergency brake with the fulcrum coupling serving as a fulcrum in the joint application of both brakes and the fulcrum point of connection of the service brake lever serving as a fulcrum in the independent application of the emergency brake.

In testimony whereof, I have signed this specification at East St. Louis, State of Illinois.

GLENN R. HOFFMAN.